(12) United States Patent
Soldan

(10) Patent No.: US 8,881,010 B2
(45) Date of Patent: Nov. 4, 2014

(54) ADAPTING TRICK COMMANDS TO PRIOR USAGE

(75) Inventor: Eric Soldan, Saratoga, CA (US)

(73) Assignee: Microsoft Corporation, Redmond, WA (US)

(*) Notice: Subject to any disclaimer, the term of this patent is extended or adjusted under 35 U.S.C. 154(b) by 381 days.

(21) Appl. No.: 13/248,757

(22) Filed: Sep. 29, 2011

(65) Prior Publication Data

US 2013/0086475 A1  Apr. 4, 2013

(51) Int. Cl.
*G06F 3/14* (2006.01)
*G11B 27/34* (2006.01)
*G11B 27/10* (2006.01)
*H04N 21/6587* (2011.01)
*H04N 21/4147* (2011.01)

(52) U.S. Cl.
CPC .............. *G11B 27/105* (2013.01); *G11B 27/34* (2013.01); *H04N 21/6587* (2013.01); *H04N 21/4147* (2013.01)
USPC .......... 715/720; 715/727; 725/34; 705/14.64; 701/50; 704/275

(58) Field of Classification Search
CPC ..................................... G06F 3/14; G06F 3/17
USPC .......... 715/200–277, 700–867; 700/701–866; 709/201–229; 705/14.64, 50–79; 345/30–111; 701/50; 704/275; 725/34
See application file for complete search history.

(56) References Cited

U.S. PATENT DOCUMENTS

| | | | |
|---|---|---|---|
| 5,899,950 A * | 5/1999 | Milender et al. ................ | 701/50 |
| 7,904,814 B2 | 3/2011 | Errico et al. | |
| 7,937,382 B2 | 5/2011 | Soldan et al. | |
| 8,307,390 B2 * | 11/2012 | Holden ........................... | 725/34 |
| 2002/0010589 A1 * | 1/2002 | Nashida et al. ................ | 704/275 |
| 2008/0084400 A1 | 4/2008 | Rosenberg | |
| 2010/0215340 A1 | 8/2010 | Pettit et al. | |
| 2011/0314381 A1 * | 12/2011 | Fuller et al. ................... | 715/727 |
| 2012/0158511 A1 * | 6/2012 | Lucero et al. ............. | 705/14.64 |

OTHER PUBLICATIONS

Drucker, et al., "SmartSkip: Consumer level browsing and skipping of digital video content", Retrieved at <<http://citeseerx.ist.psu.edu/viewdoc/download?doi=10.1.1.94.7249&rep=rep1&type=pdf>>, Proceedings of the SIGCHI Conference on Human Factors in Computing Systems, Apr. 2002, pp. 8.

Chorianopoulos, et al., "SocialSkip: Pragmatic Understanding within Web Video", Retrieved at <<http://www.ionio.gr/~choko/publications/SocialSkip%20Pragmatic%20Understanding%20within%20Web%20Video.pdf>>, Proceddings of the 9th international interactive conference on Interactive television, Jun. 29-Jul. 1, 2011, pp. 4.

"SnapStream's Beyond TV 3—The Must-Have Home Multimedia Software", Retrieved at <<http://www.anandtech.com/show/1320/12, Retrieved Date: Jul. 7, 2011, pp. 7.

* cited by examiner

*Primary Examiner* — Ruay Ho
(74) *Attorney, Agent, or Firm* — Aaron Chatterjee; Peter Taylor; Micky Minhas

(57) ABSTRACT

Adapting trick commands to prior trick command usage is disclosed. In one example, during playback of a video content item, a user input of a sequence of trick commands is received that has a net effect on a playback location in the video content item, and in response to the sequence of trick commands, response to a later trick command is adapted based upon the net effect of the sequence of trick commands.

18 Claims, 6 Drawing Sheets

ADAPTING TRICK COMMANDS TO PRIOR USAGE

BACKGROUND

Various media delivery and presentation technologies, including but not limited to network streaming technologies and digital video recorders (DVRs), may allow a user to accelerate through and/or skip over content in either a forward or reverse viewing direction. Such playback may be referred to as "trick" playback. Trick commands such as forward skip and skip backward may correspond to fixed time offsets from a location in a media content item at which the command is entered. Thus, a user may quickly move to a desired location in a video content item, skip undesired portions of content, etc. by performing one or more of such trick commands.

SUMMARY

Embodiments are disclosed that relate to adapting trick commands to prior trick command usage. For example, one disclosed embodiment provides a method of operating a media presentation device, the method comprising, during playback of a video content item, receiving a user input of a sequence of trick commands that has a net effect on a playback location in the video content item, and in response to the sequence of trick commands, adapting a response to a later trick command based upon the net effect of the sequence of trick commands.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
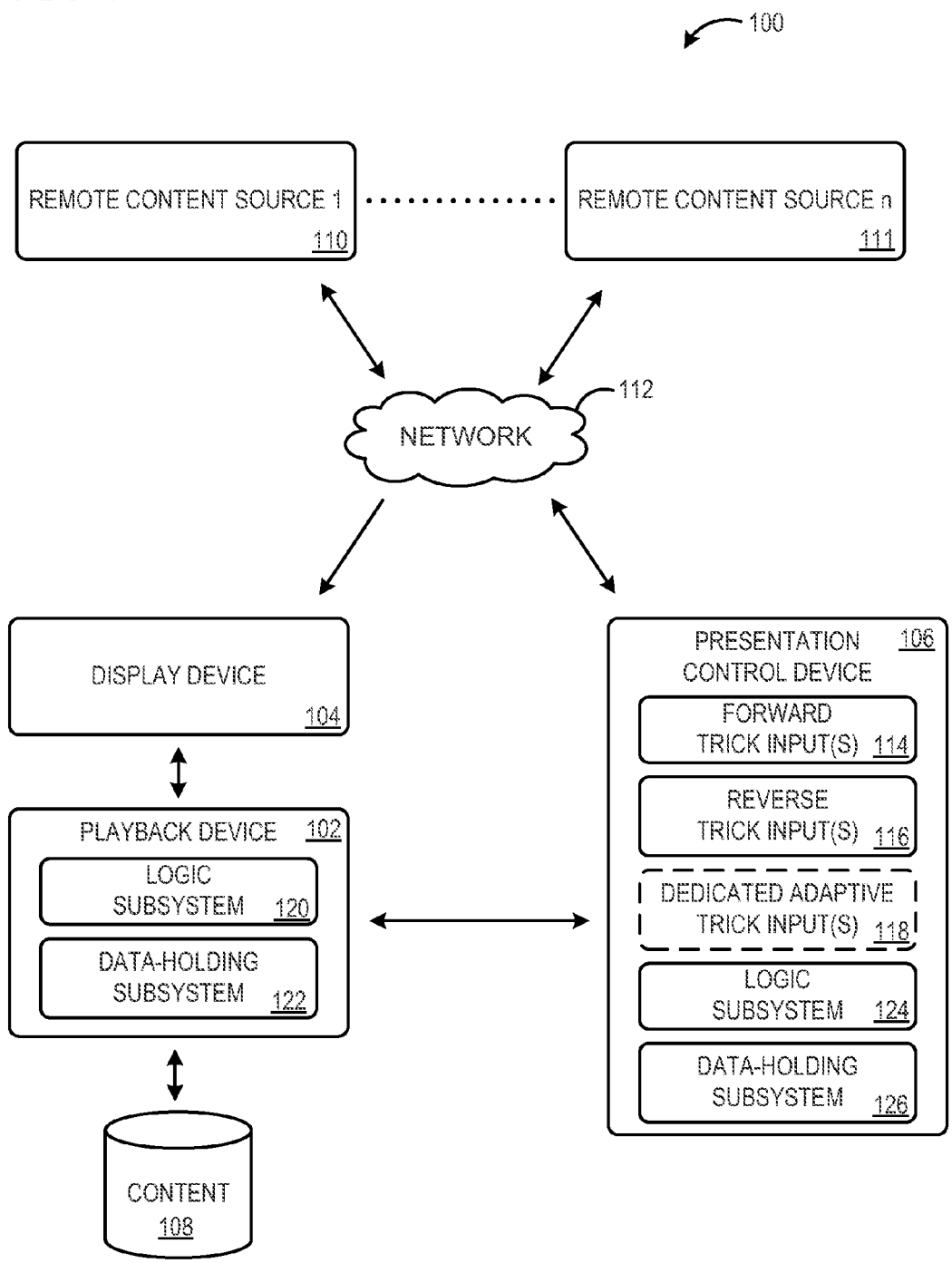
FIG. 1 shows an example embodiment of a media delivery and presentation environment.

During media playback, a user that wishes to skip portions of media content (e.g. commercials, huddles in a football game, etc.) may issue multiple trick commands to skip to the desired location in the content. In many instances, the type of content that is being skipped may appear multiple times in a media content item. Thus, a user may repeatedly perform like sequences of trick commands during a viewing session. In each of these instances, the sequence of trick commands entered by the user is intended to accomplish a single net action.

Thus, embodiments are disclosed herein that relate to adapting trick commands based upon prior trick command usage. For example, a media presentation device, such as a display device, a set-top box, a remote control, a companion device (e.g. a mobile phone, notepad computer, laptop computer, portable media player, portable video game system, etc.), and/or any other device used to control the presentation of media, may observe user behavior and deduce how to adjust a response to a user input of a trick command to achieve the intended effect of a sequence of commands via a lesser number of commands.

In some embodiments, a dedicated adaptive trick command input (e.g. a dedicated user interface control, specified combination of conventional user interface controls, specified gesture and/or voice command for a natural user interface, etc.) may be utilized to adapt to use patterns, while in other embodiments, a response of one or more conventional trick command inputs may be adapted. As a more specific example, when skipping a two minute commercial break, a user may issue four thirty-second forward skip commands to skip a total of two minutes in a forward direction, and then one reverse skip command to skip backward a small amount (e.g. eight seconds). This may be performed, for example, because the user did not instantly issue a forward skip command when the commercial break started, and therefore must skip backward to avoid missing any desired content immediately following the commercial break. In this instance, a total forward skip time of one minute and fifty-two seconds may be assigned to a dedicated adaptive skip user interface control to allow the user to achieve the same net effect with a single button press. As another example, if the user performs another sequence of four forward skip commands, one of the four forward skip commands may be automatically shortened by eight seconds so that the user does not have to issue the reverse skip command.

It is noted that, unlike the use of scene detection to automatically stop forward or reverse trick playback, adaptive trick playback as disclosed herein may be used to intelligently skip within a single scene of a content item. As a more specific example, if it is desired to skip the huddle between football plays to watch a game more quickly, one thirty second skip followed by one eight second reverse skip (for a total forward skip of twenty two seconds) may be sufficient to skip each huddle. Whereas automatic scene detection may not be able to discern such intra-content events, the adaptation of trick commands based upon prior usage may allow a user to skip huddles via a single input, or a reduced number of inputs, after entering the trick command sequence initially.

Before discussing these embodiments in more detail, an example media presentation environment 100 is described with reference to FIG. 1. Media presentation environment 100 comprises various media presentation devices, such as a playback device 102 configured to provide content to a display device 104 for display, and a presentation control device 106 configured to remotely provide commands to playback device 102. In some embodiments, the playback device 102 may be integrated with the display device 104, while in other embodiments, the playback device 102 may be separate from and connected to the display device 104. Examples of suitable playback devices 102 include, but are not limited to, television systems with integrated tuners, set-top boxes (e.g. cable television boxes, satellite television boxes), video game systems, digital video recorders (DVRs) and other media recording devices, media computer systems, and any other device that may provide content to a display device for display.

The playback device 102 may receive content from any suitable content source. For example, the playback device 102 may receive content from local storage 108, such as a mass storage device of a DVR system. The local storage 108 may be integrated with the playback device 102 in a common enclosure, or may be a separate component connected to the playback device 102. Likewise, the playback device also may receive content from remote content sources, illustrated as remote content source 1 110 and remote content source n 111 accessible by computer network 112. The remote content sources 110, 111 may represent any suitable content source, including but not limited to cable television providers, satellite television providers, web sites configured to stream media over a network, etc.

The presentation control device 106 is configured to allow a user to control the playback device 102, and may take any suitable form. Examples of presentation control devices include, but are not limited to, dedicated remote control devices, as well as smart phones, tablet computers and other companion devices on which an application for controlling the playback device 102 is executable. The presentation control device 106 comprises various user interface controls that allow a user to issue playback commands, such as trick commands, to the playback device 102. Trick command input controls are illustrated schematically in FIG. 1 as forward trick input(s) 114, reverse trick input(s) 116, and optional dedicated adaptive trick input(s) 118. In various embodiments, such user interface controls may be implemented via hardware and/or software. For example, a dedicated remote control device for controlling a DVR may include hardware buttons for functions such as play, stop, pause, forward skip, skip backward, etc. Likewise, a companion device may comprise software that implements software playback controls as a graphical user interface on a touch-sensitive display.

The presentation control device 106 may communicate with the playback device 102 in any suitable manner. For example, in some embodiments, the presentation control device 106 may communicate directly with the playback device 102 via infrared, short-range radiofrequency, or other such communications technologies. In other embodiments, the presentation control device 106 may communicate with the playback device 102 over a computer network, such as network 112.

The playback device 102 and the presentation control device 106 each may take the form of a computing device. As such, the playback device 102 and the presentation control device 106 each may comprise a logic subsystem configured to execute instructions, and a data-holding subsystem configured to hold instructions executable by the logic subsystem to implement various tasks related presenting media and controlling the presentation of media, including but not limited to adapting trick commands based upon previous usage. The logic subsystem and data-holding subsystem for the display device are illustrated respectively at 120 and 122, and for the presentation control device respectively at 124 and 126. Logic for adapting trick commands may reside on the playback device 102, the presentation control device 106, or may be distributed between such devices. Details on the computing aspects of the playback device 102 and the presentation control device 106 are described in more detail below.

Figure 2:
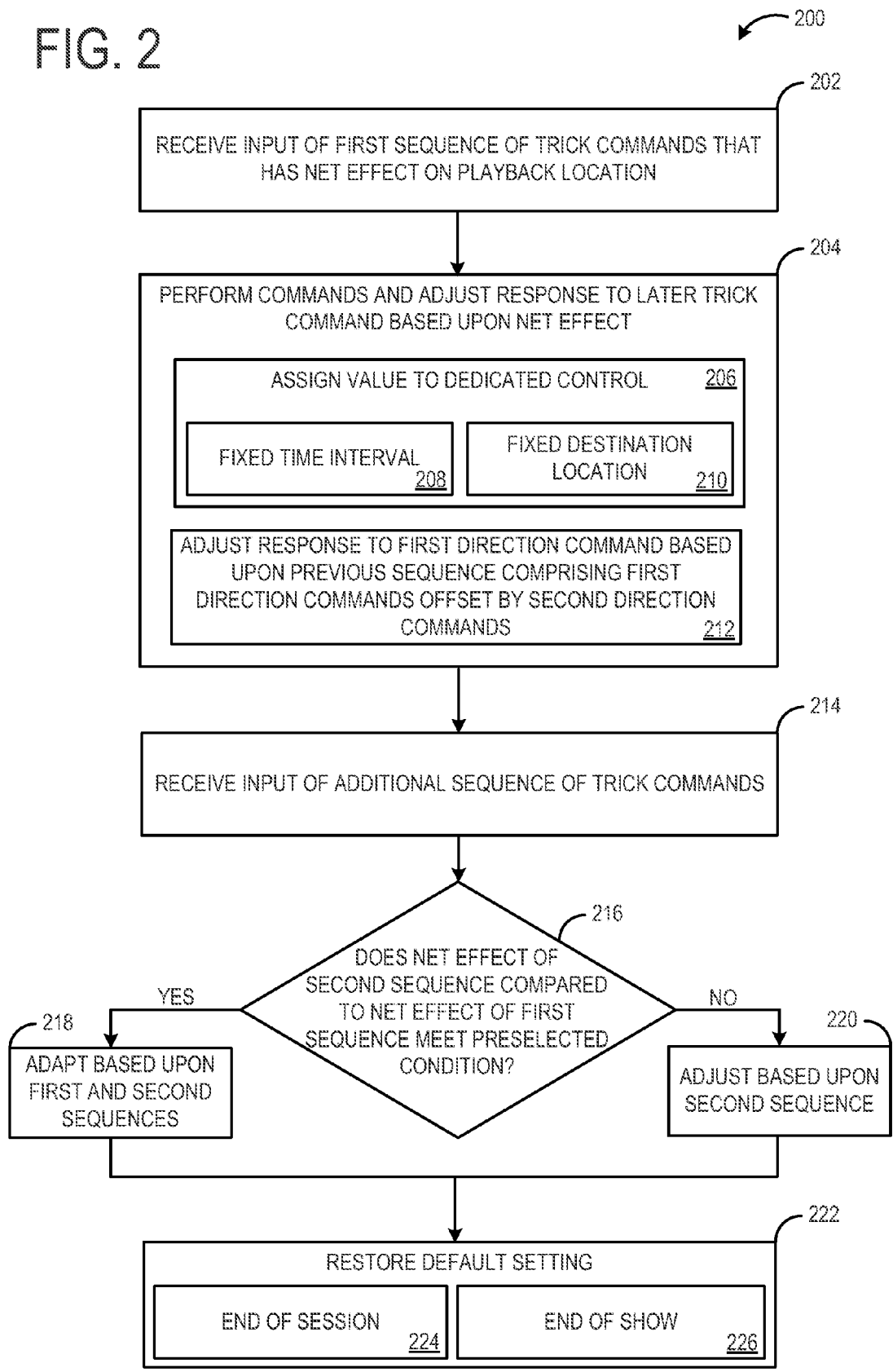
FIG. 2 shows a flow diagram depicting an embodiment of a method of operating a media presentation device.

FIG. 2 shows a flow diagram depicting an embodiment of a method 200 of adapting trick commands to prior usage. Method 200 comprises, at 202, receiving a user input of a sequence of trick commands that has a net effect on a playback location in the video content item. For example, as described above, such a sequence may comprise two or more trick commands requesting to skip or accelerate in a single direction or different directions.

In response to the sequence of trick commands, method 200 comprises, at 204, performing the requested sequence of trick commands, and also adapting a response to a later trick command based upon the net effect of the requested sequence of commands. For example, the response to the later trick command may be adjusted such that the net effect is reproduced via a lesser number of trick commands. Likewise, the response to the later trick command may be adjusted so that an effect based on, but not equal to, the net effect is achieved via a lesser number of trick commands. As a more specific example of such an adjustment, a sequence comprising a previously-set dedicated adaptive trick command of one minute and fifty two seconds plus a reverse skip of eight seconds may result in averaging the previous value and the net effect of the new sequence, such that the dedicated control will forward skip one minute and forty eight seconds the next time it is selected.

The net effect of a sequence of trick commands may be determined in any suitable manner. For example, during a use session, data may be collected regarding the location during playback at which the user starts to use trick playback, the trick commands entered and the timing thereof, and the location at which the user stops trick playback. The net effect may then be determined from such data.

Likewise, the adaption of the response to the later trick command may be implemented in any suitable manner. For example, as indicated at 206 and as mentioned above, an adaptive command response may be assigned to a dedicated control. The dedicated control may take the form of a single hardware or software control, a specific combination of hardware and/or software controls, a specified voice command, specified gesture, and/or any other suitable user input.

Further, any suitable adaptive trick command response may be assigned to such a dedicated control. For example, in some embodiments, a fixed time interval may be assigned, as indicated at 208, while in other embodiments, a fixed destination location within a content item may be assigned, as indicated at 210. A fixed location may be assigned to the dedicated control if it is determined from a pattern of previous usage that a user consistently skips ahead or behind to a specified time in a content item. For example, if it is determined that a user consistently skips ahead to the fifteen minute mark in a local newscast each evening, then the dedicated adaptive control may be assigned a forward skip value of "fifteen minutes from start," such that selection of the control skips to the fifteen minute mark in that show.

Continuing with FIG. 2, instead of or in addition to assigning an adaptive trick response to a dedicated adaptive control, a response to a command in a first direction may be adjusted based upon a previous sequence of trick commands comprising one or more first direction commands offset by one or more second direction commands having a lesser total skipped time than the one or more first direction commands. For example, referring to the two minute commercial break example described above, an input sequence of four thirty-second forward skip commands and one eight second reverse skip may result in a net effect of a forward skip one minute and fifty two seconds. In this instance, one of the four forward skip responses in a future trick command sequence used to skip a future two minute commercial break may be automatically shortened by the second direction offset of eight seconds so that the user does not have to issue the reverse skip command. Any of the four forward skip responses to the future trick command sequence may be shortened. For example, in some embodiments, the first forward skip response instance in the sequence may be shortened based upon an assumption that a user may react similarly slowly when entering sequences of other than four forward skip commands. In other embodiments, a fourth response instance may be shortened such that the adjustment is not made unless four or more forward skip commands are entered. It will be understood that these examples are described for the purpose of illustration, and are not intended to be limiting in any manner.

In some embodiments, adaptive trick command settings may be stored in association with specified shows (e.g. a series or individual show), users, etc. This may help to make such trick commands available to users immediately upon starting a future use session. For example, a DVR system programmed to store a sitcom series and a weekly sports presentation may store a "commercial skip" adaptive trick command for the sitcom series and a "huddle skip" adaptive trick command for the weekly sports presentation, based upon user patterns detected during playback of the recorded series.

Where multiple users utilize a single playback device, individual adaptive trick command response settings for each user may be stored in various ways. For example, such settings may be stored on individual companion devices utilized by each user to interact with the playback device. Likewise, such settings may be stored on a playback device based upon user account information. In such embodiments, settings may be associated with a particular user based upon user identity data acquired by viewing environment sensors during use sessions (e.g. if a user elects to operate a viewing environment image sensor and/or audio sensor while consuming media content), or by manual identification of each user (e.g. by logging into the playback device before a viewing session). It will be understood that these methods for associating adaptive trick commands with specific users are presented for the purpose of example, and are not intended to be limiting in any manner.

As mentioned above, in some embodiments, later trick commands may be used to adjust a previously-determined adaptive trick command. For example, if a user selects a dedicated adaptive trick command, and then performs an additional trick command to adjust the endpoint playback location reached via the previously-set adaptive response, the additional trick command may be used to further adjust the previously-set adaptive trick command response. In this manner, an adaptive trick command response may be fine-tuned through additional usage.

It will be understood that, in some instances, it may not be desirable to fine-tune a previously-set adaptive trick command response based upon additional trick commands, as a different net effect may be intended via the new sequence compared to the previously-set response. Thus, before modifying a previously-set adaptive trick command response, it may first be determined whether the net effect of the sequence of trick commands is sufficiently similar to the previously-set response to consider the user intent of the new sequence and the previously-set response to be similar or the same. Referring again to FIG. 2, method 200 comprises, at 214, receiving a second user input of a sequence of trick commands. The second sequence may comprise a combination of a dedicated trick command input plus other trick commands, or may comprise a sequence of conventional trick commands. Then, at 216, method 200 comprises comparing the net effects of the second sequence and the first sequence received at 202 to determine whether a net effect of the second user input meets a predetermined condition relative to the first sequence. As one non-limiting example, a percentage difference between the net effect of the second sequence of trick commands and the first sequence may be compared to a threshold percentage.

If it is determined that the net effect of the second user input meets the preselected condition (e.g. is less than the threshold percentage), then the adaptive trick command response may be adjusted based upon both the first sequence and the second sequence, as indicated at 218. This may allow fine tuning of the adaptive trick command response based upon cumulative similar usage.

On the other hand, if it is determined that the net effect of the second user input does not meet the preselected condition (e.g. is greater than the threshold percentage), then method 200 comprises, at 220, adjusting the adaptive trick command based upon the second sequence, instead of upon the first and second sequences. This may help to adapt to new sequences of trick commands more quickly.

In some embodiments, an adaptive trick command response may persist until adjusted or replaced based upon future trick command sequences. In other embodiments, an adaptive trick command response occasionally may be reset to a default setting, for example, periodically or upon occurrence of preselected events. Thus, method 200 comprises, at 222, restoring a default setting of the trick commands. Example events that may trigger such a reset include, but are not limited to, an end of a viewing session 224 and/or an end of a show 226.

Figure 3:
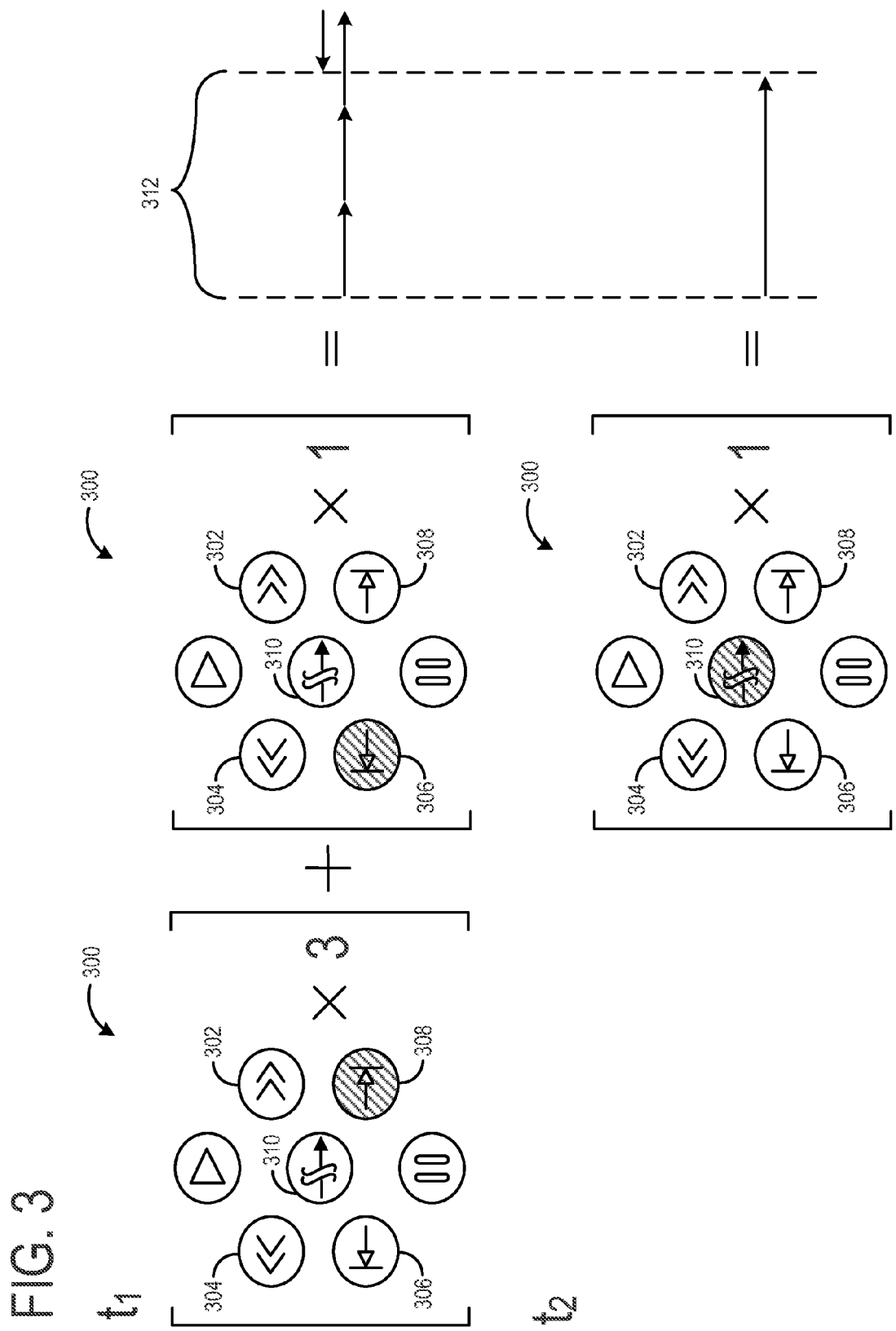
FIG. 3 schematically illustrates an example of a setting of a dedicated adaptive trick command user interface control based upon a received sequence of trick command inputs.
Figure 4:
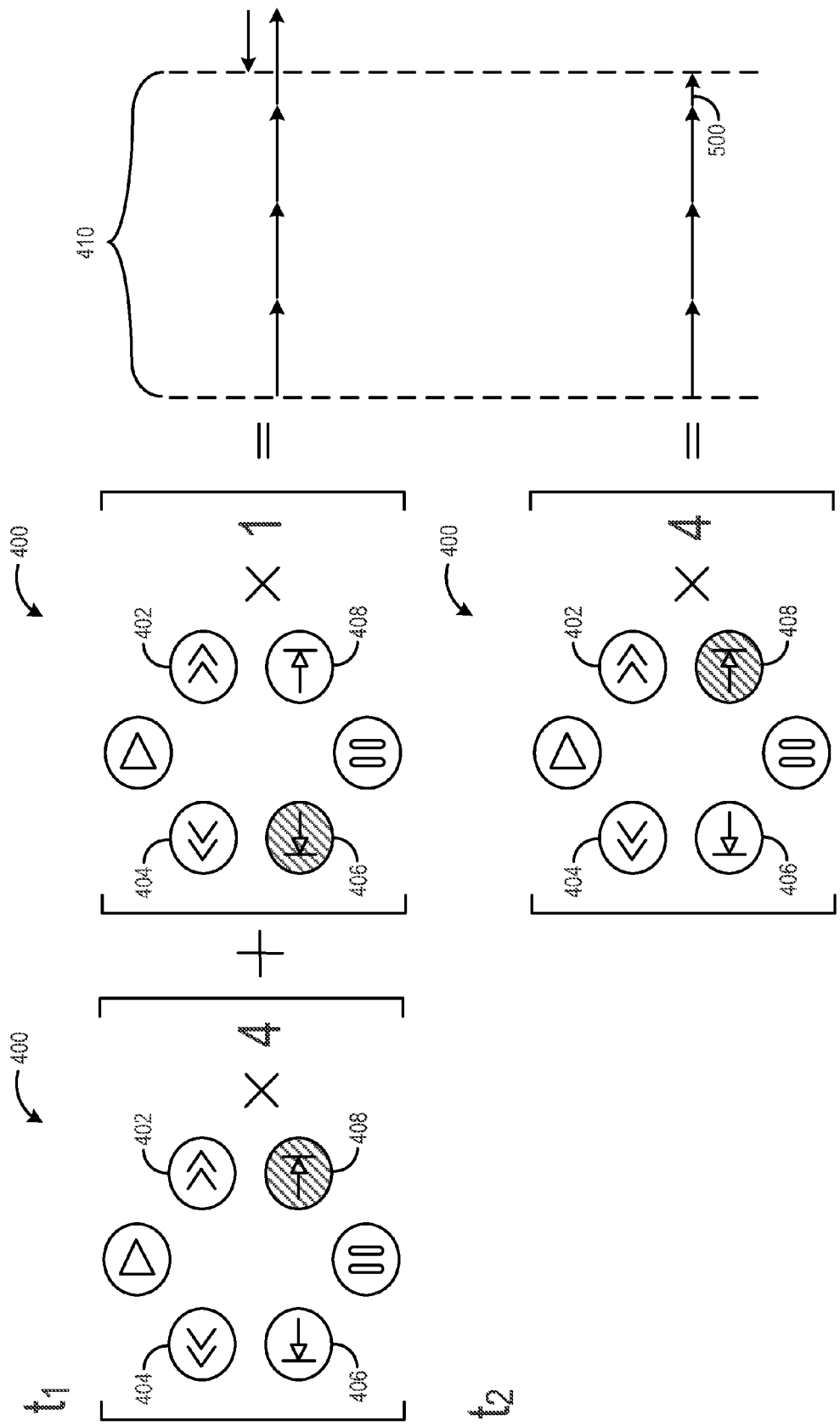
FIG. 4 schematically illustrates an example of an adjustment of a response to a second sequence of trick command inputs based upon a received first sequence of trick command inputs.
Figure 5:
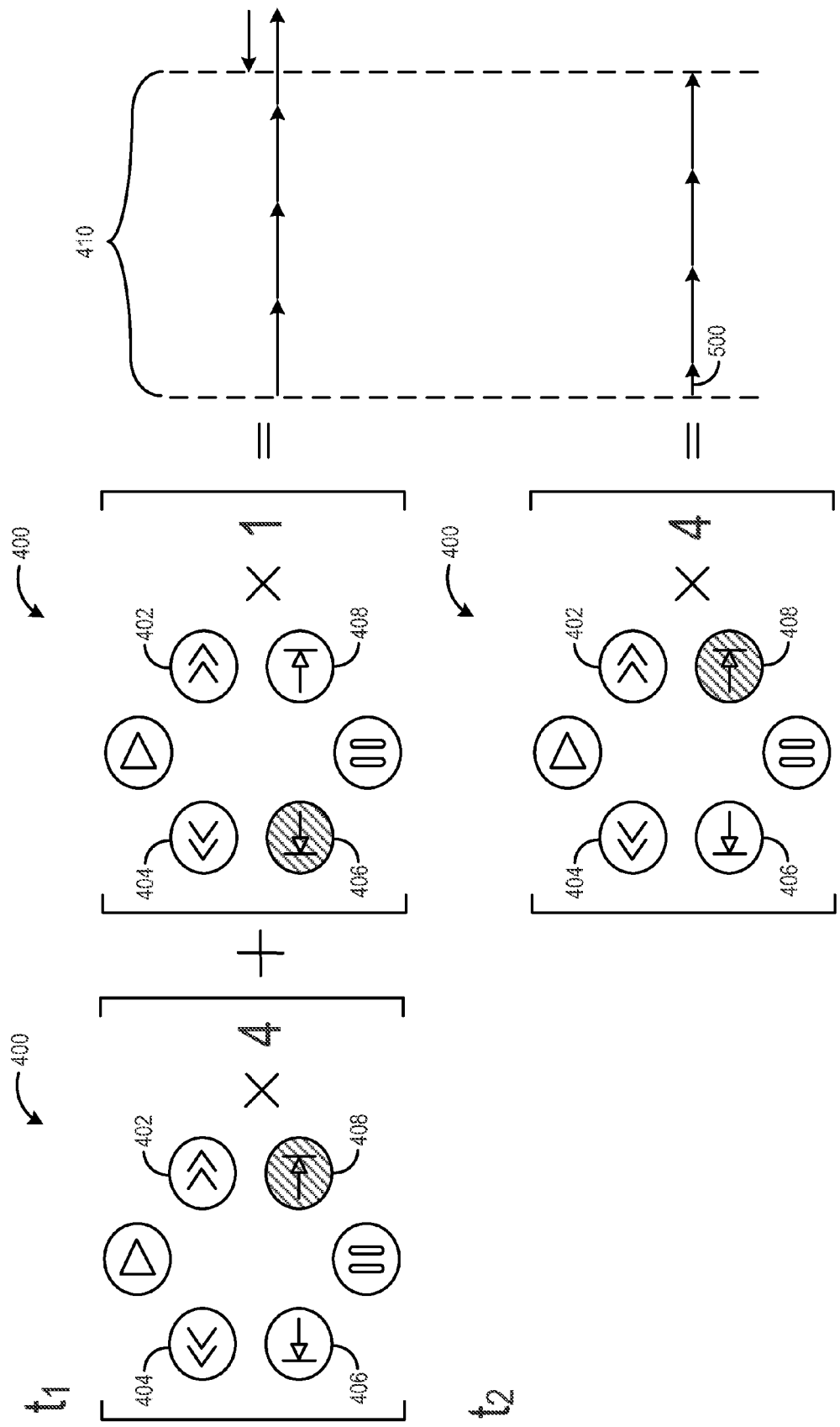
FIG. 5 schematically illustrates another example of an adjustment of a response to a second sequence of trick command inputs based upon a received first sequence of trick command inputs.

FIGS. 3-5 schematically illustrate various trick command sequences and the adjustment of subsequent trick commands thereto. It will be understood that the illustrated sequences and adjustments are presented for the purpose of example and are not intended to be limiting in any manner. First, FIG. 3 schematically illustrates a user interface 300 on a presentation control device 106, such as a remote control or companion device. The user interface 300 comprises a plurality of hardware and/or software trick command input controls, wherein the controls include a fast forward control 302, a rewind control 304, a reverse skip control 306, a forward skip control 308, and a dedicated adaptive trick control 310 labeled with a broken arrow to signify a skip of variable length. It will be understood that each control is configured to be selectable by a user to trigger a corresponding trick command response. While the broken arrow points in a forward playback direction, it will be understood that an adaptive trick command response assigned to the control also may have a net effect in a reverse direction. Likewise, while a single dedicated adaptive trick control is depicted, it will be understood that a presentation control device may include more than one adaptive trick control. In such embodiments, a user may be able to assign a sequence of trick command inputs to each dedicated adaptive control, for example, by pressing and holding a selected dedicated adaptive trick control after performing a sequence of trick commands.

FIG. 3 also schematically shows, at time $t_1$, a user selection of a sequence of three forward skip commands followed by one reverse skip command. In this figure, a user input is indicated by shading over the respective control and a multiplier ("×3") that indicates how many times the control is selected. The net effect of these inputs is illustrated at 312. Next, at time $t_2$, a single user selection of the dedicated adaptive trick control 310 results in the same net effect as the sequence of commands performed at $t_1$.

FIGS. 4 and 5 schematically illustrate a user interface 400 similar to that of FIG. 3, but without the dedicated adaptive trick control 310. The user interface 400 comprises a plurality of trick command hardware and/or software input controls, including a fast forward control 402, a rewind control 404, a reverse skip control 406, and a forward skip control 408.

FIG. 4 also schematically shows, at time $t_1$, a user selection of a sequence of four forward skip commands followed by one reverse skip command, such that the forward skip commands have a greater total skipped time than the reverse command. The net effect of these inputs is illustrated at 410. Next, at time $t_2$, the user again selects four forward skip commands. However, the response 412 to the last forward skip command is shortened, thereby achieving the net effect of the first sequence of inputs via a lesser number of inputs. FIG. 5 shows another adaptive response to the second input command sequence of FIG. 4 in which the first forward skip response 500, rather than the last, is shortened.

As mentioned above, the media presentation devices described herein, which may include but are not limited to playback devices and presentation control devices, may be implemented as a computing system. In particular, the methods and processes described herein may be implemented as a computer application, computer service, computer API, computer library, and/or other computer program product.

Figure 6:
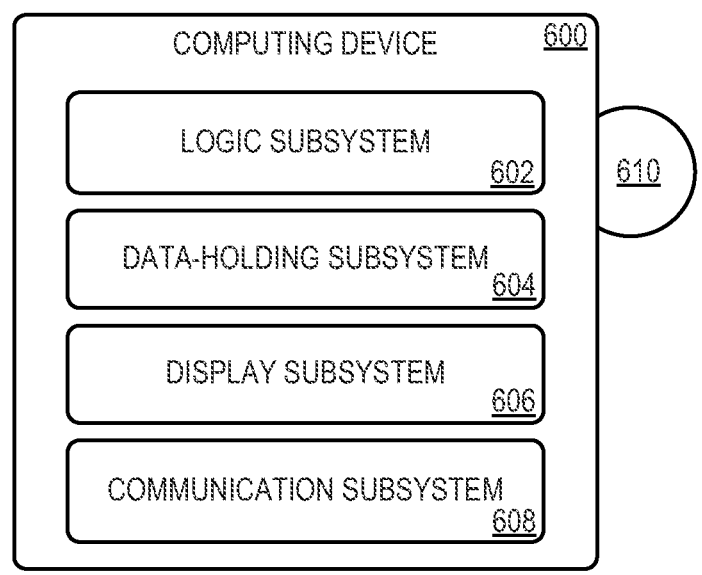
FIG. 6 shows a block diagram of an embodiment of an example media presentation device.

FIG. 6 schematically shows a nonlimiting embodiment of a computing system 600 that may perform one or more of the above described methods and processes. Computing system 600 is shown in simplified form. It is to be understood that virtually any computer architecture may be used without departing from the scope of this disclosure. In different embodiments, computing system 600 may take the form of a desktop computer, laptop computer, tablet computer, home entertainment computer, network computing device, mobile computing device, mobile communication device, gaming device, remote control device, etc.

Computing system 600 includes a logic subsystem 602 and a data-holding subsystem 604. Computing system 600 may optionally include a display subsystem 606, communication subsystem 608, and/or other components not shown in FIG. 6. Computing system 600 may also optionally include user input devices such as keyboards, mice, game controllers, cameras, microphones, and/or touch screens, for example.

Logic subsystem 602 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 602 may include one or more processors that are configured to execute software instructions. Additionally or alternatively, the logic subsystem 602 may include one or more hardware or firmware logic machines configured to execute hardware or firmware instructions. Processors of the logic subsystem 602 may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem 602 may be virtualized and executed by remotely accessible networked computing devices configured in a cloud computing configuration.

The data-holding subsystem 604 may include one or more physical, non-transitory, devices configured to hold data and/or instructions executable by the logic subsystem to implement the herein described methods and processes. When such methods and processes are implemented, the state of the data-holding subsystem 604 may be transformed (e.g., to hold different data).

The data-holding subsystem 604 may include removable media and/or built-in devices. The data-holding subsystem 604 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem 604 may include devices with one or more of the following characteristics: volatile, nonvolatile, dynamic, static, read/write, read-only, random access, sequential access, location addressable, file addressable, and content addressable. In some embodiments, logic subsystem 602 and the data-holding subsystem 604 may be integrated into one or more common devices, such as an application specific integrated circuit or a system on a chip.

FIG. 6 also shows an aspect of the data-holding subsystem 604 in the form of removable computer-readable storage media 610, which may be used to store and/or transfer data and/or instructions executable to implement the herein described methods and processes. Removable computer-readable storage media 610 may take the form of CDs, DVDs, HD-DVDs, Blu-Ray Discs, EEPROMs, and/or floppy disks, among others.

It is to be appreciated that the data-holding subsystem 604 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

Display subsystem 606 may be used to present a visual representation of data held by the data-holding subsystem 604. As the herein described methods and processes change the data held by the data-holding subsystem 604, and thus transform the state of the data-holding subsystem 604, the state of display subsystem 606 may likewise be transformed to visually represent changes in the underlying data. Display subsystem 606 may include one or more display devices utilizing virtually any type of technology. Such display devices may be combined with logic subsystem 602 and/or the data-holding subsystem 604 in a shared enclosure, or such display devices may be peripheral display devices.

Communication subsystem 608 may be configured to communicatively couple computing system 600 with one or more other computing devices. Communication subsystem 608 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow computing system 600 to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating a media presentation device, the method comprising:
during playback of a video content item, receiving a user input of a sequence of trick commands that has a net time effect on a playback location in the video content item, the sequence of trick commands including a selected trick command having a corresponding time effect and one or more additional trick commands having one or more additional corresponding time effects that combine to form the net time effect;
in response to the sequence of trick commands, adjusting playback based upon the net time effect and adapting the corresponding time effect of the selected trick command based upon the net time effect of the sequence of trick commands to form an adapted time effect for the selected trick command;
receiving a later input of the selected trick command; and
in response to the later input of the selected trick command, adjusting playback based upon the adapted time effect.

2. The method of claim 1, wherein the selected trick command comprises one or more of fast forward, rewind, reverse skip, and forward skip.

3. The method of claim 1, wherein the selected trick command comprises a dedicated trick command input control.

4. The method of claim 3, wherein the net time effect assigned to the dedicated trick command input control comprises a fixed time interval.

5. The method of claim 3, wherein the net time effect assigned to the dedicated trick command input control comprises a fixed destination location within the video content item.

6. The method of claim 5, wherein the fixed destination location is determined based upon a pattern detected in a plurality of trick command sequences.

7. The method of claim 1, wherein receiving the sequence of trick commands comprises receiving one or more first direction trick commands offset by one or more second direction trick commands, and
wherein adapting the corresponding time effect of the selected trick command comprises adapting an amount of time skipped in a later first direction trick command based upon an offset of the one or more second direction trick commands.

8. The method of claim 1, wherein receiving the user input of the sequence of trick commands and adapting the corresponding time effect of the selected trick command comprise receiving the user input and adapting the corresponding time effect via one or more of a remote control device and a companion device configured to communicate with a media playback device.

9. The method of claim 1, wherein the sequence is a first sequence, and wherein the method further comprises:
receiving a user input of a second sequence of trick commands;
comparing a net time effect of the second sequence to the net time effect of the first sequence; and
adapting the corresponding time effect of the selected trick command if the net time effect of the second sequence meets a predetermined condition compared to the net time effect of the first sequence.

10. The method of claim 1, further comprising storing the adapted time effect for the selected trick command in association with one or more of a specified show and a specified user.

11. A presentation control device configured to communicate with a media playback device to control media playback on the media playback device, the presentation control device comprising:
a user interface comprising a plurality of trick command user input controls, the plurality of trick command user input controls comprising
one or more forward trick controls each configured to trigger a selected forward trick command response,
one or more reverse trick controls each configured to trigger a selected reverse trick command response,
one or more dedicated adaptive user interface controls each configured to trigger an adaptive trick command response having an adapted time effect based upon prior user inputs made via the one or more forward trick controls and the one or more reverse trick controls, the prior user inputs comprising a selected trick command having a corresponding time effect and one or more additional trick commands having one or more additional corresponding time effects that combine to form a net time effect on which the adapted time effect is based; and
a logic subsystem configured to execute instructions stored in a data-holding subsystem to receive user inputs made via the user interface and to send the user inputs to the media playback device.

12. The presentation control device of claim 11, wherein the instructions are executable to present the user interface as a graphical user interface on a display.

13. The presentation control device of claim 11, wherein the user interface comprises one or more hardware trick controls.

14. The presentation control device of claim 11, wherein the instructions are executable to determine a net time effect of a sequence of one or more forward trick commands and one or more reverse trick commands, and to assign a response to a selected adaptive user interface control based upon the net time effect.

15. The presentation control device of claim 14, wherein the sequence is a first sequence, and wherein the instructions are further executable to:
receive a second sequence of trick commands, the second sequence comprising the selected adaptive user interface control and one or more other trick commands;
comparing a net time effect of the second sequence to the net time effect of the first sequence;
adapting a time effect of the response assigned to the selected adaptive user interface control based on the net time effect of the first sequence and the net time effect of the second sequence if the net time effect of the second sequence meets a predetermined condition compared to the net time effect of the first sequence; and
otherwise adapting the time effect of the response based upon the net time effect of the second sequence and not the net time effect of the first sequence.

16. A method of operating a media presentation device, the method comprising:
receiving a sequence of trick commands comprising one or more first direction trick commands offset by one or more second direction trick commands;

adapting an amount of time skipped in a later first direction trick command based upon an offset of the one or more second direction trick commands, wherein adapting the amount of time skipped in the later first direction trick command comprises adapting an amount of time skipped in a last instance of a selected first direction trick command in a later sequence of trick commands.

17. The method of claim 16, wherein adapting an amount of time skipped in a later first direction trick comprises adjusting a first instance of a first direction trick command response.

18. The method of claim 16, further comprising restoring a default response to the selected first direction trick command at one or more of an end of a content item and an end of a viewing session.

* * * * *